United States Patent
Song

(10) Patent No.: US 10,992,622 B2
(45) Date of Patent: Apr. 27, 2021

(54) METHOD, TERMINAL EQUIPMENT AND STORAGE MEDIUM OF SHARING USER INFORMATION

(71) Applicant: Beijing Microlive Vision Technology Co., Ltd, Beijing (CN)

(72) Inventor: Yu Song, Beijing (CN)

(73) Assignee: Beijing Microlive Vision Technology Co., Ltd, Beijing (CN)

( * ) Notice: Subject to any disclaimer, the term of this patent is extended or adjusted under 35 U.S.C. 154(b) by 0 days.

(21) Appl. No.: 16/854,701

(22) Filed: Apr. 21, 2020

(65) Prior Publication Data

US 2020/0259771 A1    Aug. 13, 2020

Related U.S. Application Data

(63) Continuation of application No. PCT/CN2018/124767, filed on Dec. 28, 2018.

(30) Foreign Application Priority Data

Jul. 6, 2018    (CN) .......................... 201810737268.1

(51) Int. Cl.
    *H04L 12/58*    (2006.01)
    *G06Q 30/02*    (2012.01)
    *H04L 29/08*    (2006.01)

(52) U.S. Cl.
    CPC ............ *H04L 51/10* (2013.01); *G06Q 30/02* (2013.01); *H04L 51/04* (2013.01); *H04L 51/08* (2013.01); *H04L 51/14* (2013.01); *H04L 67/06* (2013.01); *H04L 67/306* (2013.01)

(58) Field of Classification Search
    CPC ......... G06Q 30/02; H04L 51/04; H04L 51/08; H04L 51/10; H04L 51/14; H04L 67/06; H04L 67/306
    See application file for complete search history.

(56) References Cited

U.S. PATENT DOCUMENTS

2006/0026119 A1* 2/2006 Mirrashidi .............. G06F 16/64
2007/0226169 A1* 9/2007 Solyanik ................ G06Q 10/10
(Continued)

FOREIGN PATENT DOCUMENTS

| CN | 104660769 A | 5/2015 |
| CN | 105634926 A | 6/2016 |

(Continued)

OTHER PUBLICATIONS

International Patent Application No. PCT/CN2018/124767; Int'l Search Report; dated Apr. 4, 2019; 3 pages.

*Primary Examiner* — Gil H. Lee

(74) *Attorney, Agent, or Firm* — BakerHostetler

(57) ABSTRACT

The method, device, terminal equipment and storage medium of sharing personal information are provided. The method includes: acquiring the personal information sharing instruction; acquiring personal information to be shared according to the user attribute of the user targeted by the personal information sharing instruction; generating two at least sharing ways according to the personal information; displaying the selection page of the at least two sharing ways, and determining the sharing way based on a selection instruction from the terminal user.

17 Claims, 9 Drawing Sheets

(56) References Cited

U.S. PATENT DOCUMENTS

2009/0056525 A1* 3/2009 Oppenheimber ..... G06F 16/639
  84/609
2012/0323938 A1* 12/2012 Skeen ................ H04L 65/4069
  707/754
2018/0189391 A1* 7/2018 Ip ..................... G06F 16/24578

FOREIGN PATENT DOCUMENTS

| CN | 105872767 A | 8/2016 |
|---|---|---|
| CN | 107517320 A | 12/2017 |
| CN | 107809492 A | 3/2018 |
| CN | 108063719 A | 5/2018 |
| CN | 108984707 A | 12/2018 |
| WO | WO 2017/149533 A1 | 9/2017 |

* cited by examiner

ND, TERMINAL EQUIPMENT AND STORAGE MEDIUM OF SHARING USER INFORMATION

CROSS-REFERENCE TO RELATED APPLICATION

The disclosure is a continuation of PCT application Ser. No. PCT/CN2018/124767, filed Dec. 28, 2018, which claims priority to CN Patent Application No. 201810737268.1, filed Jul. 6, 2018, which is incorporated herein by reference as set forth herein in its entirety.

TECHNICAL FIELD

The embodiment of the disclosure relates to an internet technology, in particular to a method, a device, a terminal equipment and a storage medium of sharing personal information.

BACKGROUND ART

With the rapid development of the Internet technology, the Internet application in the terminal has also been developed unprecedentedly, and a user can share personal information of some other users whom they are interested in by using the Internet application in the terminal.

When a user browses a personal homepage of a user in an Internet application, and is interested in personal information of the user and wants to share the personal homepage to friends, relevant software can only generate a specific sharing way for the user to share without further interactivity.

SUMMARY

The following is an overview of the topics detailed in this document. This summary is not intended to limit the protecting scope of the claims.

Embodiments of the disclosure provide a method, a device, a terminal equipment and a storage medium of sharing personal information to avoid the above situations.

First, the disclosure provides a method of sharing personal information; the method includes: acquiring a personal information sharing instruction; acquiring personal information to be shared according to a user attribute of a user targeted by the personal information sharing instruction; generating at least two sharing ways according to the personal information; and displaying a selection page of the at least two sharing ways, and determining a sharing way based on a selection instruction of a terminal user.

Second, an embodiment of the disclosure further provides a device of sharing personal information, including: a sharing instruction acquirer disposed to acquire a personal information sharing instruction; a personal information acquirer disposed to acquire personal information to be shared according to a user attribute of a user targeted by the personal information sharing instruction; a sharing way generator disposed to generate at least two sharing ways according to personal information; and a sharing way determiner disposed to display a selection page of the at least two sharing ways and determine a sharing way based on a selection instruction from a terminal user.

Third, the embodiment of the disclosure further provides a terminal equipment; the terminal equipment includes: at least one processor; and a memory configured to store at least one program; when the at least one program is executed by the at least one processor, the processor implements the method of sharing personal information described in any embodiment of this disclosure.

Fourth, an embodiment of the disclosure also provides a computer readable storage medium on which a computer program is stored, and the method of sharing personal information described in any embodiment of the disclosure is realized when the computer program is executed by the processor.

Other aspects can be understood by reading and understanding the drawings and the detailed description.

DETAILED DESCRIPTION

Figure 1A:
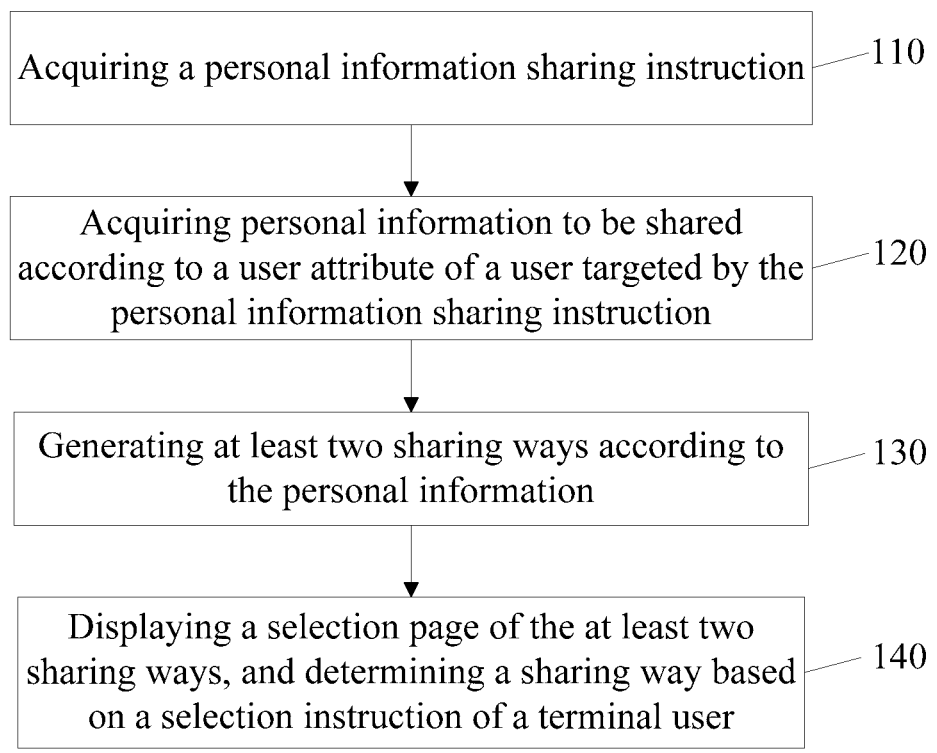
FIG. 1a is a flowchart of a method of sharing personal information provided by an embodiment of the disclosure.

The disclosure is described in further detail below with reference to the drawings and embodiments. It is to be understood that the specific embodiments described herein are merely illustrative and are not intended to limit the disclosure. It is also to be understood that for sake of description, only those portions that are pertinent to this disclosure instead of their entirety are displayed in the drawings.

FIG. 1a is a flowchart of a method of sharing personal information provided by an embodiment of the disclosure. The embodiment may be adapted for sharing personal information. The method can be performed by a device of sharing personal information; the device can be implemented by at least one of software and hardware, and generally integrated in a terminal equipment such as a cell phone or a tablet computer. As shown in FIG. 1a, the method includes steps 110-140.

In step 110, a personal information sharing instruction is acquired.

A sharing control can be provided, and the personal information sharing instruction is acquired when a terminal user triggers the sharing control.

Acquiring the personal information sharing instruction may include: detecting a triggering operation of a homepage sharing control by the terminal user on a personal homepage of the terminal user; or detecting a triggering operation of a personal business card sharing control by the terminal user on a personal homepage of other users browsed by the terminal user.

Figure 1B:
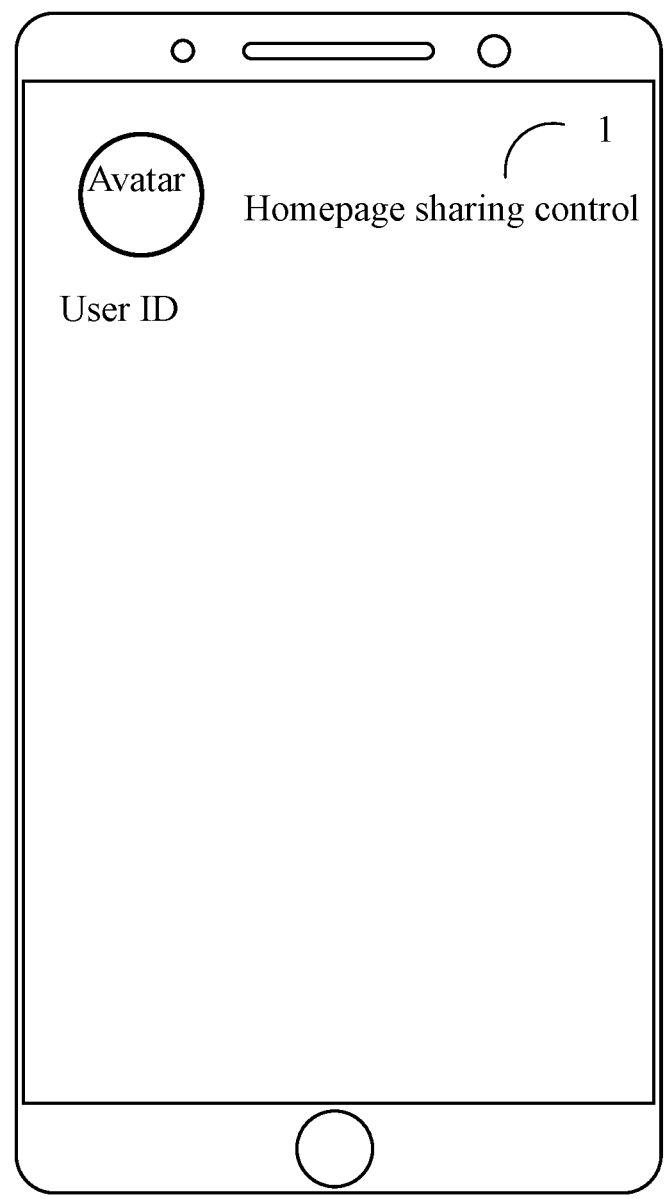
FIG. 1b is a schematic view of a personal homepage of a terminal user in an embodiment of the disclosure.
Figure 1C:
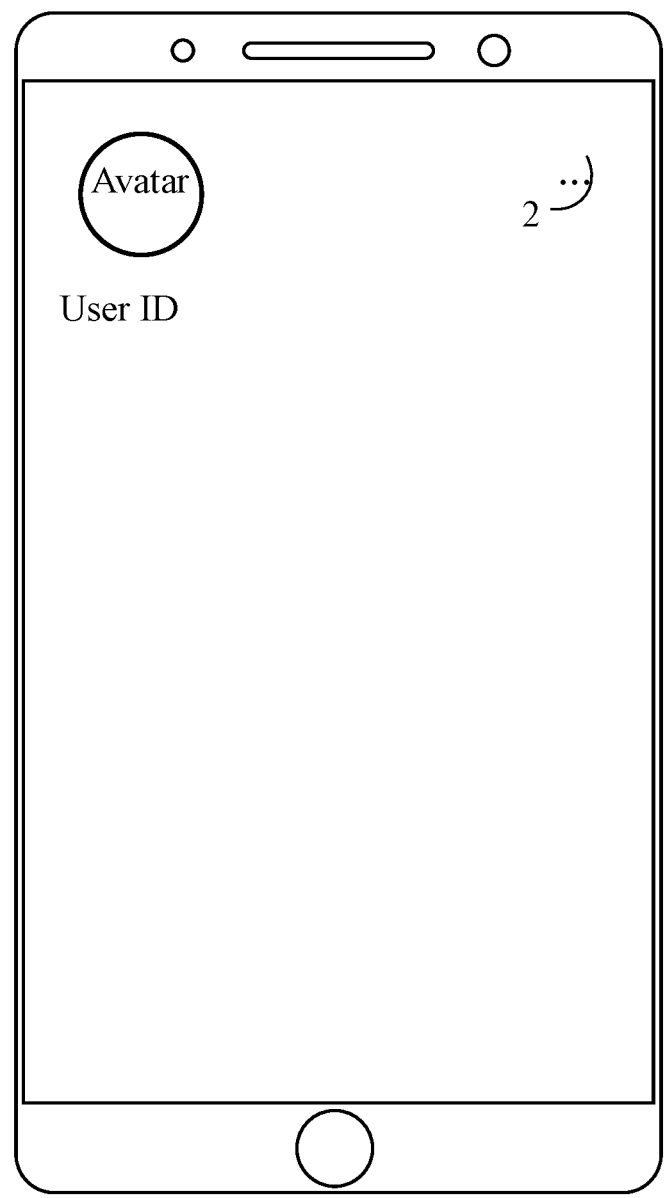
FIG. 1c is a schematic view of a personal homepage of other users browsed by a terminal user in an embodiment of the disclosure.
Figure 1D:
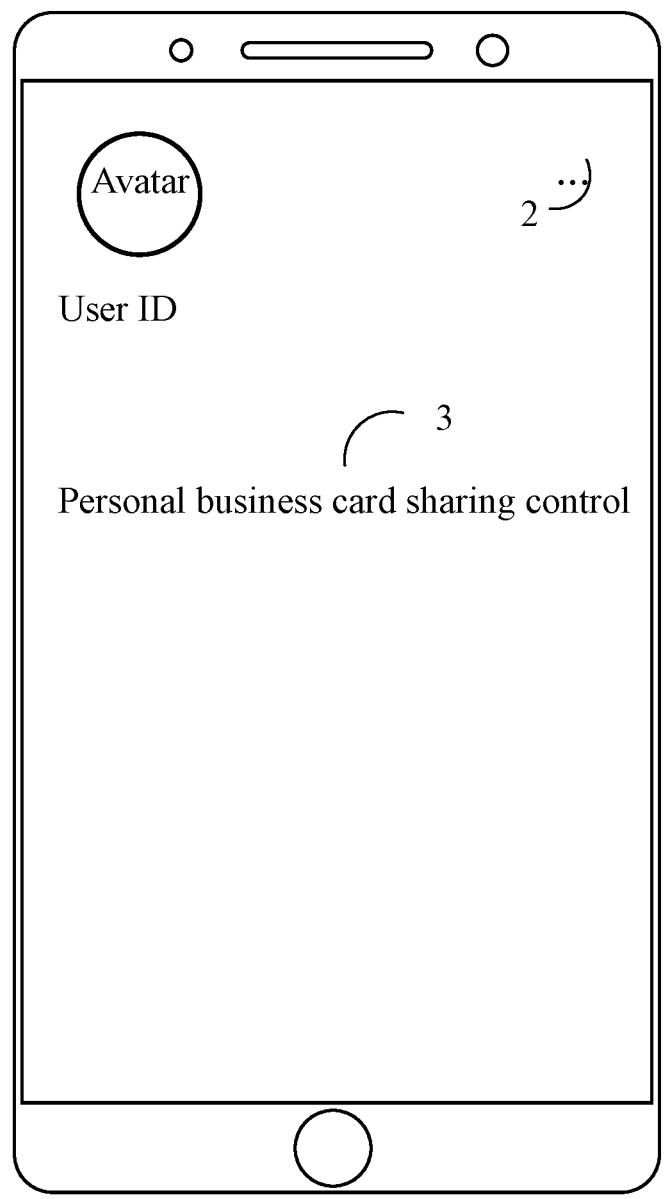
FIG. 1d is a schematic view of showing a personal business card sharing control on a webpage of a personal homepage of other users browsed by a terminal user in an embodiment of the disclosure.

With respect to share the personal homepage of the terminal user and share the personal homepage of other users, positions of the sharing control are different. As shown in FIG. 1b, a homepage sharing control 1 is provided on a personal homepage of the terminal user, and when an operation of the homepage sharing control 1 on the personal homepage of the terminal user triggered by the terminal user is detected, the personal information sharing instruction of the terminal user is acquired. FIG. 1c is a schematic view of a personal homepage of other users browsed by the terminal user in an embodiment of the disclosure; as shown in FIG. 1c, when a triggering operation of an ellipsis control 2 by the terminal user is detected, a personal business card sharing control 3 is displayed on a page of the personal homepage of other users browsed by the terminal user. As shown in FIG. 1d, when a triggering operation of the personal business card sharing control 3 by the terminal user is detected, a personal information sharing instruction from the terminal user to other users is acquired.

In step 120, the personal information to be shared is acquired according to a user attribute of the user targeted by the personal information sharing instruction.

The user attribute refers to a specific attribute given when a user registers. For example, the user attribute of certain video sharing software can include an ordinary user and a musician user; the ordinary user can be a user using the video sharing software to share videos shot by the user or to watch videos shared by other users, and the musician user can compose music in person and share the music with other ordinary users.

The user attributes of the user targeted by the personal information sharing instruction are different, and the required personal information to be shared is also different. For example, an ordinary user may acquire an identification of the ordinary user and the corresponding work, while a musician user may acquire an identification of the musician user and the corresponding original music. Therefore, according to the user attribute of the user targeted by the personal information sharing instruction, the personal information corresponding to the user attribute is acquired.

In step 130, according to the personal information, at least two sharing ways are generated.

The at least two sharing ways can include a sharing poster, a sharing link and other sharing ways. The sharing poster displays personal information of a user on one poster; other users can visually perceive the personal information of the user targeted by the sharing poster according to the sharing poster, and other users can conveniently follow the user targeted by the sharing poster; the sharing link is a sort of network link, and the other user can click the sharing link and view a personal homepage of the user targeted by the sharing link through a browser.

The acquired personal information to be shared is generated into at least two sharing ways, so that the terminal user can select a preferred way to share, which can result in improving interactivity with the terminal user.

In step 140, a selection page of the at least two sharing ways is displayed, and the sharing way is determined based on a selection instruction from the terminal user.

After generating at least two sharing ways, the selection page of the at least two sharing ways is displayed; the terminal user can click a favorite sharing way on the selection page, and the sharing way is determined based on a selection instruction from the terminal user; and after determining the sharing way, other users designated by the terminal user can receive it by the sharing way. The selection page can further include multiple sharing channels for the terminal user from which to select, and after the terminal user selects the sharing channel, the determined sharing way is shared to other users designated by the terminal user through the sharing channel selected by the terminal user. The sharing channel is the application platform which can carry out social communication, such as an application platform where the personal information to be shared is included, or a third-party application platform (such as microblogs, WeChat and the like).

According to the technical solution of the embodiment, after the personal information sharing instruction is acquired, the personal information to be shared is acquired according to the user attribute of the user targeted by the personal information sharing instruction; the acquired personal information to be shared is generated into at least two sharing ways; the selection page of the at least two sharing ways is displayed, and the sharing way is determined based on a selection instruction from the terminal user. A sharing way is determined by generating at least two sharing ways and interacting with the terminal user for sharing, which can enhance the interactivity and user experience for sharing.

On the basis of the foregoing technical solution, acquiring personal information to be shared according to the user attribute of the user targeted by the personal information sharing instruction can include: in response to the operation of determining that the targeted user is an ordinary user, acquiring a user identification, a nickname, a quick response code (QR code) and a work cover of the ordinary user as the personal information to be shared; or acquiring the user identification, the nickname, the quick response code and the user avatar of the ordinary user as the personal information to be shared; in response to the operation of determining that the targeted user is a musician user, acquiring a musician user identification, a nickname, a quick response code, the number of original music, the number of likes/praises, and the number of people who have shot with the original music of the musician user and the work cover as the personal information to be shared.

The ordinary user can be a user using the video sharing software to share videos shot by the user or to watch videos shared by other users, and the musician user can compose music in person and share the music with other ordinary users. According to the user attribute of the user targeted by the personal information sharing instruction, corresponding personal information to be shared is acquired; when the user targeted by the personal information sharing instruction is an ordinary user, the required personal information to be shared includes the user identification, the nickname and the quick response code; the personal information to be shared also includes a corresponding work cover when the ordinary user has works; the personal information to be shared also includes the corresponding avatar of the user when the ordinary user does not have a work; when the user targeted by the personal information sharing instruction is a musician user, the required personal information to be shared includes the user identification, the nickname, the quick response code, the number of original music, the number of praises, and the number of people who have shot with the original music of the musician user and the work cover. When the user targeted by the personal information sharing instruction is the user himself/herself, the above personal information to be shared is all the personal information of the user; when the user targeted by the personal information sharing instruction is another user, the above personal information to be shared is public personal information of another user. The quick response code may identify specific personal information of the user.

In one embodiment, acquiring the work cover of an ordinary user includes any one of: acquiring a work cover of a first work of the ordinary user as the work cover of the ordinary user; selecting a work randomly from works of the ordinary user and acquiring a work cover thereof as the work cover of the ordinary user; selecting a work with the largest number of clicks or likes from works of the ordinary user and acquiring a work cover thereof as the work cover of the ordinary user; and determining the work cover of the ordinary user by interacting with the user.

The work cover of an ordinary user can be acquired in any one of the above ways. Determining the work cover of the ordinary user by interacting with the user may be displaying the work covers of all public works of the ordinary user and selecting a work cover by the user, so that the interaction with the user is further improved.

In one embodiment, acquiring a work cover of the musician user includes any one of: acquiring a work cover of a first work of the musician user as the work cover of the musician user; selecting a work randomly from works of the musician user and acquiring a work cover thereof as the work cover of the musician user; selecting a work with the largest number of clicks or likes from works of the musician user and acquiring a work cover thereof as the work cover of the musician user; and determining the work cover of the musician user by interacting with the user.

The work cover of a musician user can be acquired in any one of the above modes. Determining the work cover of the musician user by interacting with the user may be displaying the work covers of all public original music of the musician user and selecting a work cover by the user, so that the interaction with the user is further improved.

Figure 2A:
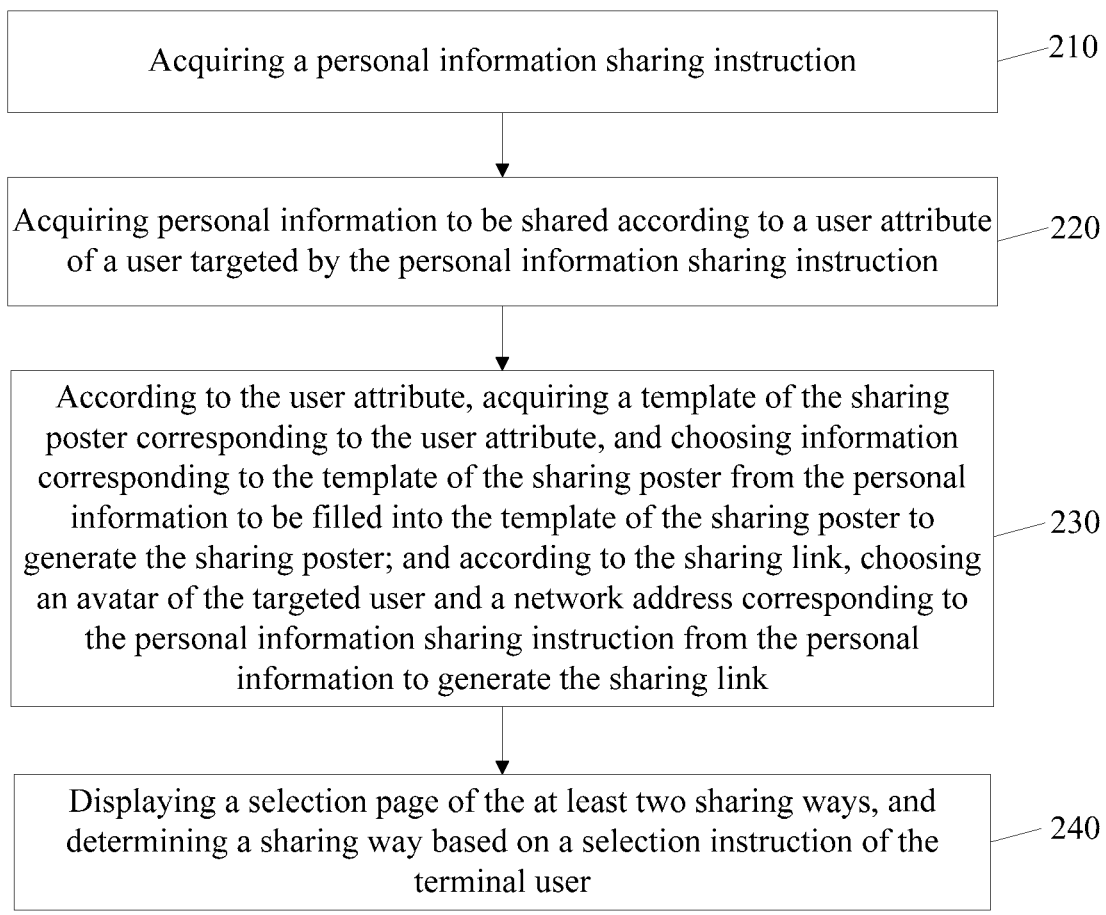
FIG. 2a is a flowchart of a method of sharing personal information provided by an embodiment of the disclosure.

FIG. 2a is a flowchart of a method of sharing personal information provided by an embodiment of the disclosure; the embodiment adds more details compared with the embodiment described above. For example, two sharing ways are exemplified, and the two sharing ways are the sharing poster and the sharing link. As shown in FIG. 2a, the method includes steps 210-240.

In step 210, a personal information sharing instruction is acquired.

In step 220, the personal information to be shared is acquired according to the user attribute of the user targeted by the personal information sharing instruction.

In step 230, according to the user attribute, the step 230 can include acquiring the template of the sharing poster corresponding to the user attribute, and choosing the information corresponding to the template of the sharing poster from the personal information to be filled into the template of the sharing poster to generate the sharing poster; and according to the sharing link, choosing the avatar of the targeted user and the network address corresponding to the personal information sharing instruction from the personal information to generate the sharing link.

The template of the sharing poster is a pre-established template corresponding to the user attribute; different user attributes also correspond to different templates of the sharing poster, and different filling positions of personal information are regulated in the templates of the sharing poster.

Personal information in a template of the sharing poster of an ordinary user includes a user identification, a nickname, a quick response code and a work cover; or a user identification, a nickname, a quick response code and a user avatar. That is, the user with the work can acquire the work cover, and for the user without work, the avatar of the user is displayed at the corresponding position of the sharing poster. The personal information collected by the template of the sharing poster of the musician user includes the user identification, the nickname, the quick response code, the number of original music, the number of praises, the number of people who have shot with the original music of the musician user, and a work cover. Corresponding information is chosen from the personal information according to the user attribute to be filled in the corresponding position of the template of the sharing poster corresponding to the user attribute to generate the sharing poster. When the sharing link is generated, only the avatar of the targeted user and the network address corresponding to the personal information sharing instruction are necessary to be selected from the personal information to generate the corresponding sharing link.

In step 240, a selection page for the at least two sharing ways is displayed, and the sharing way is determined based on a selection instruction of the terminal user.

Figure 2B:
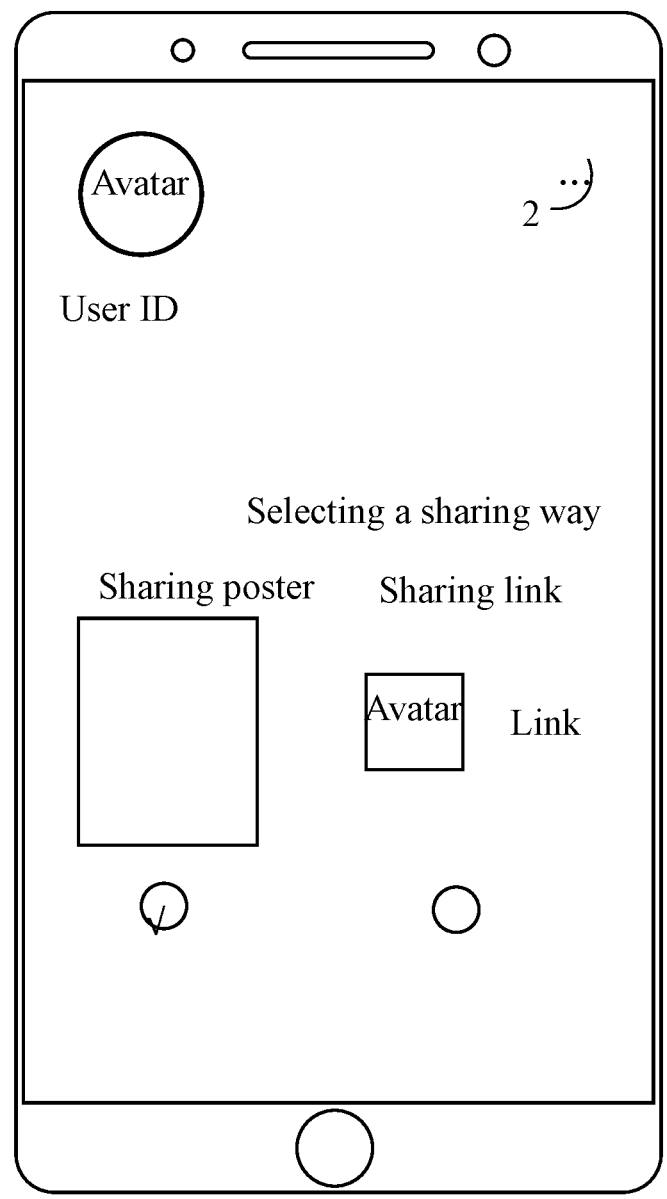
FIG. 2b is a schematic diagram of a selection page of two sharing ways in an embodiment of the disclosure.

FIG. 2b is a schematic diagram of a selection page for two sharing ways in an embodiment of the disclosure. As shown in FIG. 2b, the selection page is overlaid on the personal homepage of the user targeted by the personal information sharing instruction, and the sharing poster is displayed in the form of a thumbnail and placed alongside the sharing link. The sharing poster is provided with a quick response code corresponding to personal information to be shared; after the terminal user shares the sharing poster to another user, an interface viewed by the user is a picture of the sharing poster, and a corresponding personal homepage can be directed by identifying the quick response code on the sharing poster. After the terminal user shares the sharing link to another user, another user can click the link to be directed to the corresponding personal homepage.

Technical solution of the embodiment, on the basis of the above embodiments, is acquiring a template of a sharing poster corresponding to the user attribute according to the user attribute, selecting the information corresponding to the template of the sharing poster from the personal information to be filled into the template of the sharing poster for rapidly generating the sharing poster; when the sharing link is generated, directly acquiring the avatar of the user targeted by the personal information sharing instruction and the corresponding network address to quickly generate the sharing link.

On the basis of the foregoing technical solution, after the selection page for at least two ways is displayed, the method can further includes: in response to the operation of clicking the sharing poster by the terminal user, displaying the enlarged picture of the sharing poster; in response to detect the triggering operation of the download control on the enlarged picture by the terminal user, downloading the enlarged picture; in response to detect the operation of triggering the area other than the download control on the enlarged picture by the terminal user, redisplaying the selection page of at least two sharing ways.

Figure 2C:
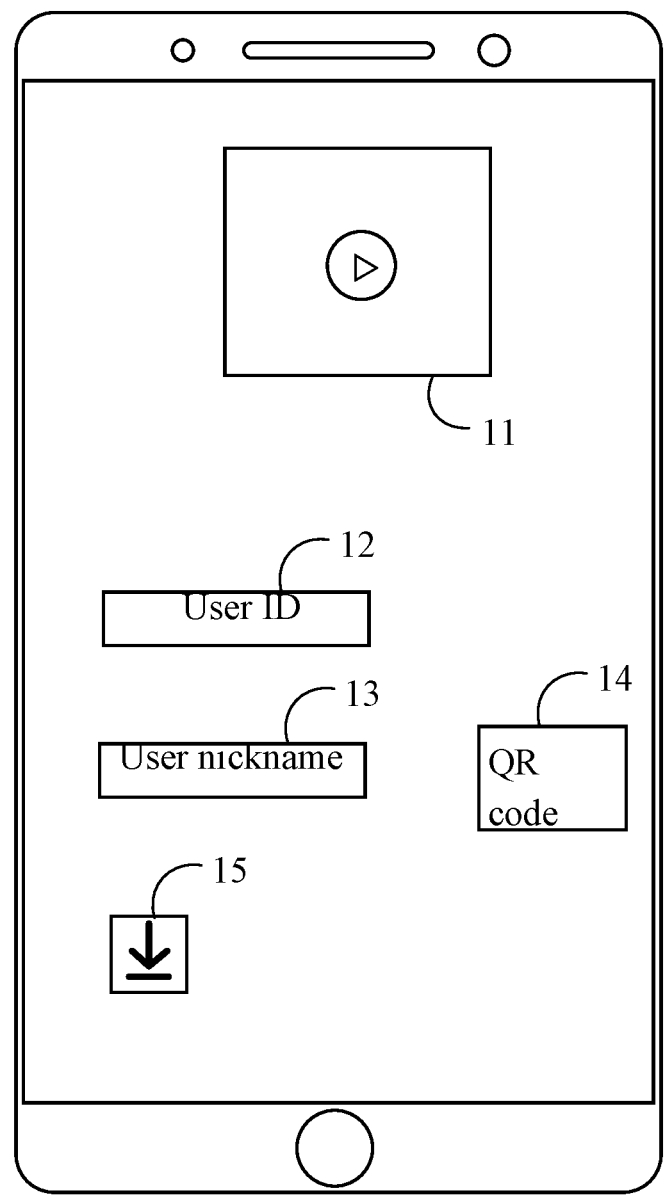
FIG. 2c is a schematic diagram of an enlarged picture of a sharing poster of an ordinary user in an embodiment of the disclosure.
Figure 2D:
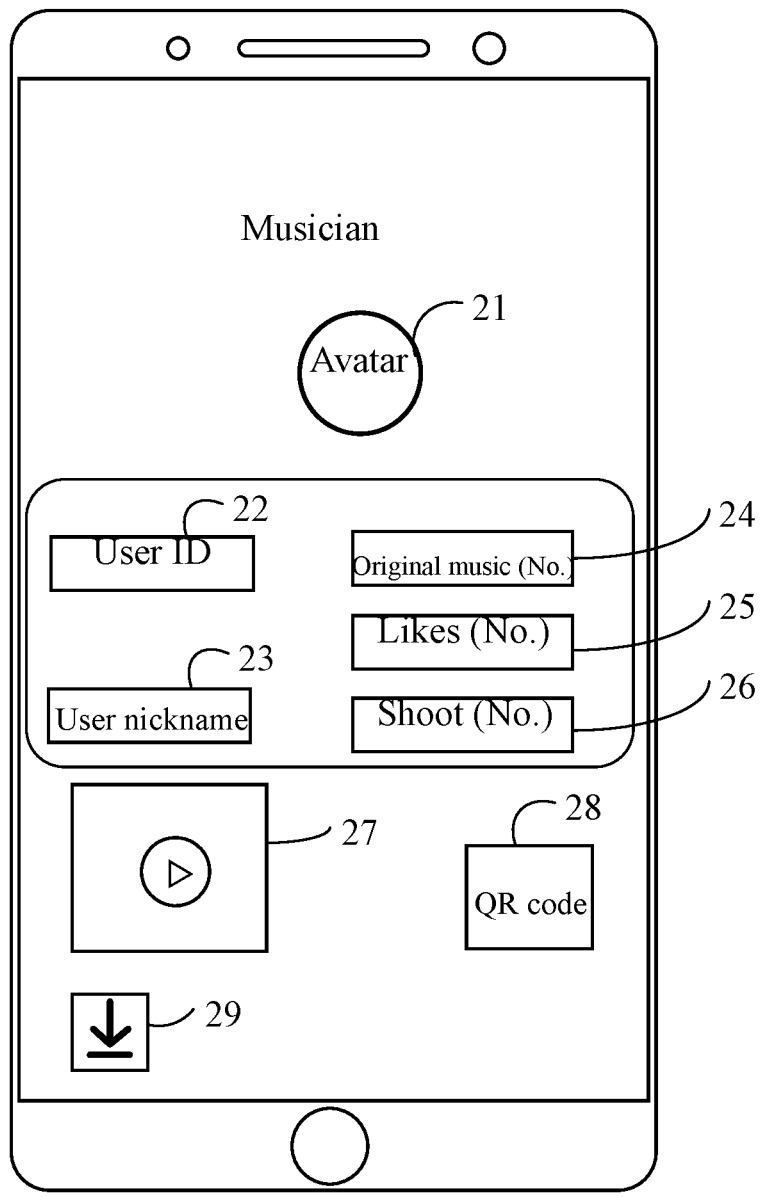
FIG. 2d is a schematic diagram of an enlarged picture of a sharing poster of a musician user in an embodiment of the disclosure.

FIG. 2c is a schematic diagram of an enlarged picture of a sharing poster for an ordinary user in the embodiment of the disclosure; as shown in FIG. 2c, the enlarged picture is displayed on the whole display interface, and FIG. 2c illustrates an ordinary user with works as an example; and as shown in FIG. 2c, the work cover 11 is displayed on an upper position which is relatively prominent on the sharing poster, and the user identification 12, the nickname 13 and the quick response code 14 are displayed in a position below the work cover 11. The enlarged picture further includes the download control 15; if a triggering operation of the download control 15 by the terminal user is detected, the enlarged picture will be downloaded locally; and if an operation of triggering the area other than the download control 15 by the terminal user is detected, the selection page containing the thumbnail of the sharing poster and the sharing link shown in FIG. 2b will be redisplayed. FIG. 2d is a schematic diagram of an enlarged picture of the sharing poster of the musician user in an embodiment of the disclosure; as shown in FIG. 2d, the enlarged picture is displayed on the whole display interface, and FIG. 2d illustrates a musician user with original music works as an example; as shown in FIG. 2d, the word "musician" is first displayed at an upper position on the sharing poster, and the user avatar 21 of the musician user is displayed at a position below the word "musician"; the user identification 22, the nickname 23, the number of original music 24, the number of praises 25, and the number of people 26 who have shot with the original music of the musician user are displayed at a position below the user avatar 21; the work cover 27 of the musician user is displayed at the lower left corner of the display interface, and the quick response code 28 of the musician user is displayed at the right side of the work cover. The enlarged picture also includes the download control 29; if a triggering operation of the download control 29 by the terminal user is detected, the enlarged picture will be downloaded locally, and if an operation of triggering the area other than the download control 29 by the terminal user is detected, the selection page containing the thumbnail of the sharing poster and the sharing link shown in FIG. 2b will be redisplayed. The play icons on the work covers of the ordinary user and the musician user indicate that the works of the users can be played. By displaying the enlarged picture, the terminal user can conveniently view and share personal information included in the poster, and the interaction with the terminal user is further improved.

Figure 3:
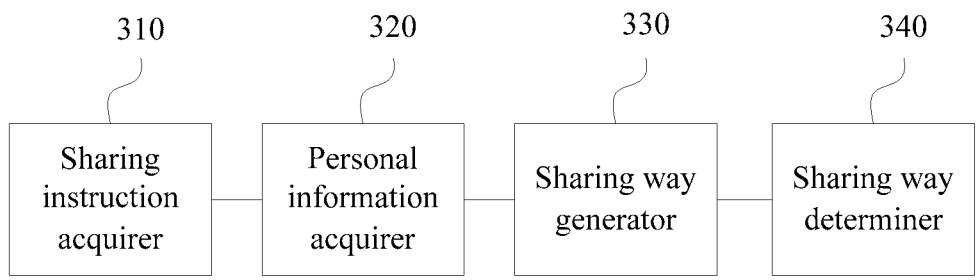
FIG. 3 is a structural schematic diagram of a device of sharing personal information provided by an embodiment of the disclosure.

FIG. 3 is a structural schematic diagram of a device of sharing personal information provided by an embodiment of the disclosure. The embodiment may be adapted for sharing personal information. The device can perform the method of sharing personal information; the device can be implemented by at least one of software and hardware, and generally integrated in the terminal equipment such as a cell phone or a tablet computer. As shown in FIG. 3, the device of sharing personal information according to the embodiment of the disclosure includes a sharing instruction acquirer 310, a personal information acquirer 320, a sharing way generator 330 and a sharing way determiner 340.

The sharing instruction acquirer 310 is configured to acquire a personal information sharing instruction.

The personal information acquirer 320 is configured to acquire the personal information to be shared according to the user attribute of the user targeted by the personal information sharing instruction.

The sharing way generator 330 is configured to generate at least two sharing ways according to the personal information.

The sharing way determiner 340 is configured to display a selection page for the at least two sharing ways and determine the sharing way based on the selection instruction from the terminal user.

In one embodiment, the personal information acquirer is configured to detect the triggering operation of the homepage sharing control by the terminal user on the personal homepage of the terminal user; or detect the triggering operation of the personal business card sharing control by the terminal user on the personal homepage of other users browsed by the terminal user.

In one embodiment, the personal information acquirer includes the ordinary user information acquirer and the musician user information acquirer. The ordinary user information acquirer is configured to, in response to the operation of determining that the targeted user is an ordinary user, acquire the user identification, the nickname, the quick response code and the work cover of the ordinary user as the personal information to be shared; or acquire the user identification, the nickname, the quick response code and the user avatar of the ordinary user as the personal information to be shared; the musician user information acquirer is configured to in response to the operation of determining that the targeted user is a musician user, acquire the musician user identification, the nickname, the quick response code, the number of original music, the number of praises, and the number of people who have shot with the original music of the musician user and the work cover as the personal information to be shared.

In one embodiment, the ordinary user information acquirer may acquire the work cover of the ordinary user in any one of the following ways: acquiring a work cover of a first work of the ordinary user as a work cover of the ordinary user; randomly selecting a work from the works of the ordinary user, and acquiring a work cover of the work as a work cover of the ordinary user; selecting a work with the largest number of clicks or likes from works of the ordinary user, and acquiring a work cover of the work as a work cover of the ordinary user; and determining the work cover of the ordinary user by interaction with the user.

In one embodiment, the musician information acquirer may acquire a work cover of the musician user in any one of the following ways: acquiring a work cover of the first work of the musician user as the work cover of the musician user; selecting a work randomly from works of the musician user and acquiring a work cover thereof as the work cover of the musician user; selecting a work with the largest number of clicks or praises from the works of the musician user and acquiring its work cover as the work cover of the musician user; and determining the work cover of the musician user by interacting with the user.

In one embodiment, the at least two sharing ways include the sharing poster and the sharing link.

In one embodiment, the sharing way generator includes a sharing poster generator configured to, according to the user attribute, acquire the template of the sharing poster corresponding to the user attribute, and select the information corresponding to the template of the sharing poster from the personal information to be filled into the template of the sharing poster to generate the sharing poster, and a sharing link generator configured to, according to the sharing link, select the avatar of the targeted user and the network address corresponding to the personal information sharing instruction from the personal information to generate the sharing link.

In one embodiment, it further includes a poster enlarged picture displayer configured to, in response to the operation of clicking the sharing poster by the terminal user, display the enlarged picture of the sharing poster after displaying the selection page of the at least two ways, and a poster enlarged picture downloader configured to, in response to detect the triggering operation of the download control on the enlarged picture by the terminal user, download the enlarged picture, and a selection page returner configured to, in response to detect the operation of triggering the area other than the download control on the enlarged poster by the terminal user, redisplay the selection page of at least two sharing ways.

The device of sharing personal information can execute the method of sharing personal information provided by any embodiment of the disclosure, and is provided with a functional module to execute the corresponding method. For technical details those are not described in detail in this embodiment, reference can be made to a method of sharing personal information provided in any embodiment of the disclosure.

Figure 4:
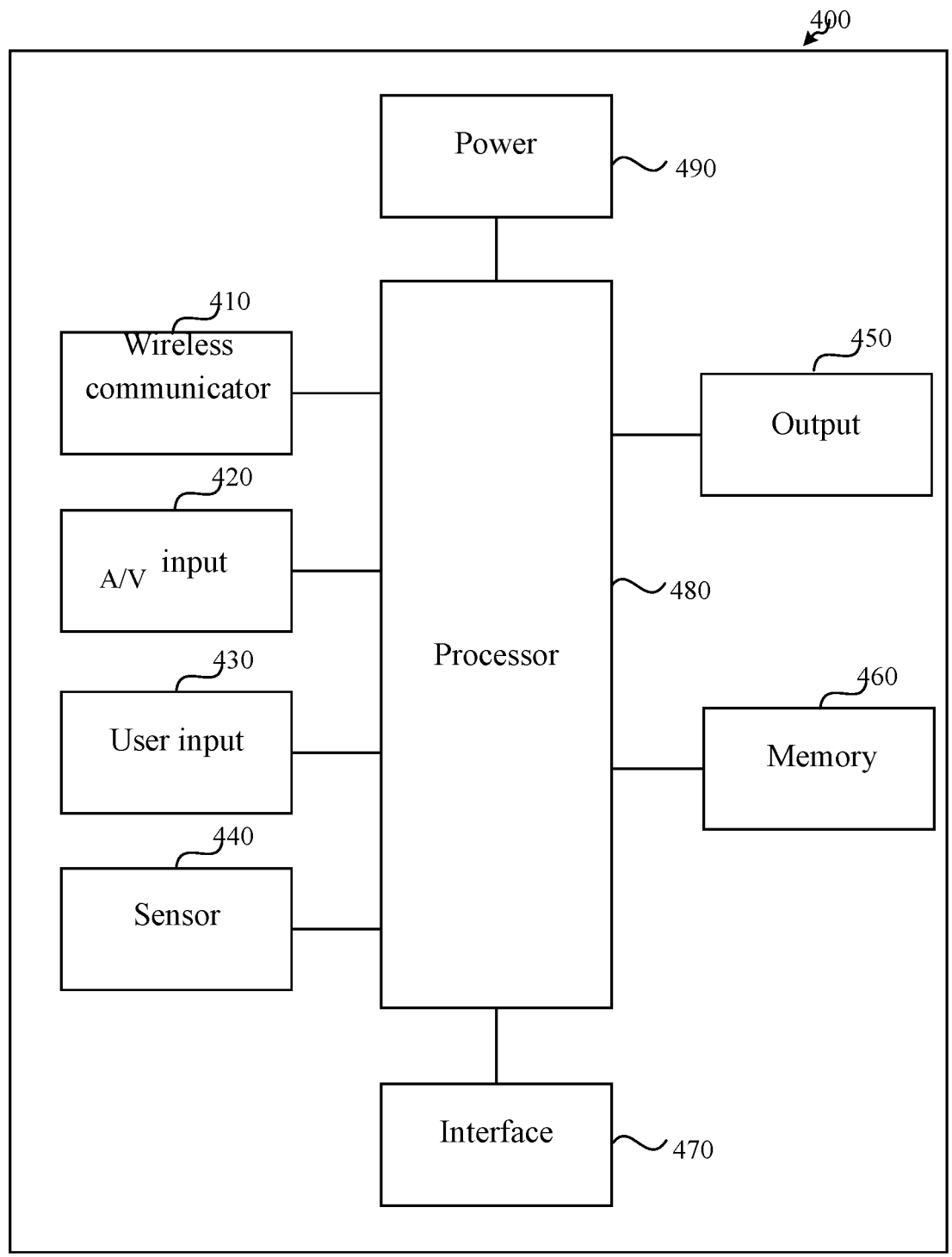
FIG. 4 is a structural schematic diagram of hardware of a terminal equipment provided by an embodiment of the disclosure.

FIG. 4 is a schematic structural diagram of hardware of a terminal equipment provided by an embodiment of the disclosure. The terminal equipment may be implemented in various forms, and the terminal equipment in the disclosure may include, but is not limited to, such as a mobile phone, a smart phone, a notebook computer, a digital broadcast receiver, a personal digital assistant (PDA), a tablet computer, portable multimedia player (PMP), navigation devices, vehicle terminal equipments, vehicle display terminals, vehicle electronic rearview mirrors and the like, and fixed terminals such as digital (TV), desktop computers and the like device.

As shown in FIG. 4, the terminal equipment 400 may include a wireless communicator 410, an audio/video (A/V) input 420, a user input 430, a sensor 440, an output 450, a memory 460, and an interface 470, a processor 480 and a power 490 and the like. FIG. 4 illustrates a terminal equipment having various components, but it should be understood that not all illustrated components may be implemented, and more or fewer components may be implemented instead.

Among them, the wireless communicator 410 allows radio communication between the terminal equipment 400 and a wireless communication system or network. The A/V input 420 is arranged to receive an audio or video signal. The user input 430 can generate key input data according to a command input by the terminal user to control various operations of the terminal equipment. The sensor 440 detects the current state of the terminal equipment 400, the location of the terminal equipment 400, the presence or absence of touch input from the terminal user to the terminal equipment 400, the orientation of the terminal equipment 400, the acceleration or deceleration movement and direction of the terminal equipment 400 and the like, and a command or signal for controlling the operation of the terminal equipment 400 is generated. The interface 470 serves as a communicable interface through which at least one external device is connected to the terminal equipment 400. The output 450 is configured to provide an output signal in at least one of visual, audio, and tactile manners. The memory 460 can store a software program or the like that performs processing and control operations performed by the processor 480, or can temporarily store data that has been output or is to be output. Memory 460 can include at least one type of storage medium. Moreover, the terminal equipment 400 can cooperate with a network storage device that performs a storage function of the memory 460 through a network connection. Processor 480 typically controls the overall operation of the terminal equipment. Additionally, processor 480 can include a multimedia module configured to render or play back multimedia data. The processor 480 can perform a pattern recognition process to recognize a handwriting input or a picture drawing input performed on the touch screen as a character or an image. The power 490 receives external power or internal power and provides the appropriate power required to operate the various components under the control of the processor 480.

The processor 480 executes various functions and the data processing of the terminal equipment 400 by running a program stored in the memory 460, for example, a method of sharing personal information provided by the embodiments of the disclosure, including: acquiring the personal information sharing instruction; acquiring personal information to be shared according to the user attribute of the user targeted by the personal information sharing instruction; generating at least two sharing ways according to the personal information; displaying the selection pages of the at least two sharing ways, and determining the sharing way based on a selection instruction from the terminal user.

Embodiments of the disclosure also provide a storage medium including computer executable instructions that are configured to perform a method of sharing personal information over execution by a computer processor; the method includes: acquiring the personal information sharing instruction; acquiring personal information to be shared according to the user attribute of the user targeted by the personal information sharing instruction; generating at least two sharing ways according to the personal information; displaying the selection pages of the at least two sharing ways, and determining the sharing way based on a selection instruction from the terminal user.

Of course, a storage medium provided by embodiments of the disclosure contains computer-executable instructions that are not limited to the method described above; related operations can also be executed in the method of sharing personal information provided by any embodiment of this disclosure.

From the above description of the implementation, it is clear to the technical personnel in the field that this disclosure can be realized with the help of software and necessary general hardware, as well as hardware. Accordingly, this essential technology scheme or the part which contributes to relevant technology can be manifested in the form of a software product; the computer software product can be stored in a computer readable storage medium, such as computer floppy disk, read-only memory (ROM), random access memory (RAM), flash, hard disk or CD and the like, including several instructions are used to enable a computer device (it could be a personal computer, server, or network device and the like) to perform the method described in each embodiment of this disclosure.

In the embodiment of the above device of sharing personal information, the units and modules are divided according to the functional logic, but not limited to the above division; as long as the corresponding functions can be realized, it will be adaptive. In addition, the specific name of each functional component is only for the convenience of distinguishing from each other and is not used to limit the protection scope of this disclosure.

What is claimed is:
1. A method of sharing user information, comprising:
    acquiring an instruction for sharing information associated with a user;
    determining an attribute of the user based on information previously provided by the user, wherein the attribute of the user is indicative of a type of the user;
    acquiring information to be shared based on the attribute of the user, wherein the acquiring information to be shared further comprises:
        in response to determining that the type of the user is an ordinary user, acquiring a user identification, a nickname, a quick response code, and a work cover or a user avatar of the user as the information to be shared, and in response to determining that the type of the user is a musician user, acquiring a user identification, a nickname, a quick response code, a number of original music composed by the user, a number of likes, and a number of people who have shot with the original music composed by the user, and a work cover of the user as the information to be shared;

generating at least two interface elements based on the acquired information, wherein the at least two interface elements are indicative of two sharing ways of sharing the information associated with the user;

displaying the at least two interface elements; and determining a sharing way based on a selection of one of the at least two interface elements.

2. The method of claim 1, wherein the acquiring an instruction for sharing information associated with a user further comprises:

detecting a triggering operation of a homepage sharing control by a terminal user on a personal homepage of the terminal user, the triggering operation of the homepage sharing control indicating an instruction for sharing information associated with the terminal user; or detecting a triggering operation of a personal business card sharing control by the terminal user on a personal homepage of another user browsed by the terminal user, the triggering operation of the personal business card sharing control indicating an instruction for sharing information associated with the another user.

3. The method of claim 1, wherein when the type of the user is an ordinary user, acquiring a work cover of the user comprises any one of:

acquiring a work cover of a first work of the ordinary user as the work cover of the ordinary user;

selecting a work randomly from works of the ordinary user and acquiring a work cover of the work as the work cover of the ordinary user;

selecting a work with the largest number of clicks or likes from works of the ordinary user and acquiring a work cover of the work as the work cover of the ordinary user; and determining the work cover of the ordinary user by interacting with the user.

4. The method of claim 1, wherein when the type of the user is a musician user, acquiring a work cover of the user comprises any one of:

acquiring a work cover of a first work of the musician user as the work cover of the musician user;

selecting a work randomly from works of the musician user and acquiring a work cover of the work as the work cover of the musician user;

selecting a work with the largest number of clicks or likes from works of the musician user and acquiring a work cover of the work as the work cover of the musician user; and determining the work cover of the musician user by interacting with the user.

5. The method of claim 1, wherein the at least two sharing ways comprise a sharing poster and a sharing link.

6. The method of claim 5, wherein generating at least two sharing ways based on the acquired information comprises:

determining a template of the sharing poster based on the attribute of the user, selecting information based on the template of the sharing poster from the acquired information, and generating the sharing poster by filling the selected information into the template of the sharing poster; and generating the sharing link by selecting an avatar of the user and a network address associated with the user from the acquired information.

7. The method according to claim 5, further comprising:

in response to detecting an operation of the terminal user clicking the sharing poster, displaying an enlarged picture of the sharing poster;

in response to detecting an operation of a download control on the enlarged picture triggered by the terminal user, downloading the enlarged picture; and in response to detecting an operation of sections other than the download control on the enlarged picture triggered by the terminal user, redisplaying a selection page of the at least two sharing ways.

8. A terminal equipment, wherein the terminal equipment comprises:

at least one processor;

at least one memory, disposed to store at least one program, when the at least one program is executed by the at least one processor, the at least one processor implementing a method of sharing user information comprising:

acquiring an instruction for sharing information associated with a user;

determining an attribute of the user based on information previously provided by the user, wherein the attribute of the user is indicative of a type of the user;

acquiring information to be shared based on the attribute of the user, wherein the acquiring information to be shared further comprises:

in response to determining that the type of the user is an ordinary user, acquiring a user identification, a nickname, a quick response code, and a work cover or a user avatar of the ordinary user as the information to be shared, and in response to determining that the type of the user is a musician user, acquiring a user identification, a nickname, a quick response code, a number of original music composed by the user, a number of likes, and a number of people who have shot with the original music composed by the user, and a work cover of the user as the information to be shared;

generating at least two interface elements based on the acquired information, wherein the at least two interface elements are indicative of two sharing ways of sharing the information associated with the user;

displaying the at least two interface elements; and determining a sharing way based on a selection of one of the at least two interface elements.

9. The terminal equipment according to claim 8, wherein the acquiring an instruction for sharing information associated with a user further comprises:

detecting a triggering operation of a homepage sharing control by a terminal user on a personal homepage of the terminal user, the triggering operation of the homepage sharing control indicating an instruction for sharing information associated with the terminal user; or detecting a triggering operation of a personal business card sharing control by the terminal user on a personal homepage of another user browsed by the terminal user, the triggering operation of the personal business card sharing control indicating an instruction for sharing information associated with the another user.

10. The terminal equipment according to claim 8, wherein when the type of the user is an ordinary user, acquiring a work cover of the user comprises any one of:
- acquiring a work cover of a first work of the ordinary user as the work cover of the ordinary user;
- selecting a work randomly from works of the ordinary user and acquiring a work cover of the work as the work cover of the ordinary user;
- selecting a work with the largest number of clicks or likes from works of the ordinary user and acquiring a work cover of the work as the work cover of the ordinary user; and
- determining the work cover of the ordinary user by interacting with the user.

11. The terminal equipment according to claim 8, wherein when the type of the user is a musician user, acquiring a work cover of the user comprises any one of:
- acquiring a work cover of a first work of the musician user as the work cover of the musician user;
- selecting a work randomly from works of the musician user and acquiring a work cover of the as the work cover of the musician user;
- selecting a work with the largest number of clicks or likes from works of the musician user and acquiring a work cover of the work as the work cover of the musician user; and
- determining the work cover of the musician user by interacting with the user.

12. The terminal equipment according to claim 8, wherein the at least two sharing ways comprise a sharing poster and a sharing link.

13. The terminal equipment according to claim 12, wherein generating at least two sharing ways based on the acquired information comprises:
- determining a template of the sharing poster based on the attribute of the user, selecting information based on the template of the sharing poster from the acquired information, and generating the sharing poster by filling the selected information into the template of the sharing poster; and
- generating the sharing link by selecting an avatar of the user and a network address associated with the user from the acquired information.

14. The terminal equipment according to claim 12, further comprising:
- in response to detecting an operation of the terminal user clicking the sharing poster, displaying an enlarged picture of the sharing poster;
- in response to detecting an operation of a download control on the enlarged picture triggered by the terminal user, downloading the enlarged picture; and
- in response to detecting an operation of sections other than the download control on the enlarged picture triggered by the terminal user, redisplaying a selection page of the at least two sharing ways.

15. A non-transitory computer readable storage medium, storing a computer program therein, wherein the computer program is executed by a processor to implement a method of sharing user information comprising:
- acquiring an instruction for sharing information associated with a user;
- determining an attribute of the user based on information previously provided by the user, wherein the attribute of the user is indicative of a type of the user;
- acquiring information to be shared based on the attribute of the user, wherein the acquiring information to be shared further comprises:
  - in response to determining that the type of the user is an ordinary user, acquiring a user identification, a nickname, a quick response code, and a work cover or a user avatar of the ordinary user as the personal information to be shared, and
  - in response to determining that the type of the user is a musician user, acquiring a user identification, a nickname, a quick response code, a number of original music composed by the user, a number of likes, and a number of people who have shot with the original music composed by the user, and a work cover of the user as the information to be shared;
- generating at least two interface elements based on the acquired information, wherein the at least two interface elements are indicative of two sharing ways of sharing the information associated with the user;
- displaying the at least two interface elements; and
- determining a sharing way based on a selection of one of the at least two interface elements.

16. The non-transitory computer readable storage medium according to claim 15, wherein acquiring a personal information sharing instruction comprises:
- detecting a triggering operation of a homepage sharing control by a terminal user on a personal homepage of the terminal user, the triggering operation of the homepage sharing control indicating an instruction for sharing information associated with the terminal user; or
- detecting a triggering operation of a personal business card sharing control by the terminal user on a personal homepage of another user browsed by the terminal user, the triggering operation of the personal business card sharing control indicating an instruction for sharing information associated with the another user.

17. The non-transitory computer readable storage medium according to claim 15, wherein when the type of the user is an ordinary user, acquiring a work cover of the user comprises any one of:
- acquiring a work cover of a first work of the ordinary user as the work cover of the ordinary user;
- selecting a work randomly from works of the ordinary user and acquiring a work cover of the work as the work cover of the ordinary user;
- selecting a work with the largest number of clicks or likes from works of the ordinary user and acquiring a work cover of the work as the work cover of the ordinary user; and
- determining the work cover of the ordinary user by interacting with the user.

* * * * *